Jan. 24, 1956    M. THOMPSON    2,731,663
POT LID WITH MAGNETIC QUICK-DETACHABLE HANDLE
Filed Oct. 15, 1953

Inventor:
Murray Thompson
BY Dudley B. Howard
Attorney.

United States Patent Office 2,731,663
Patented Jan. 24, 1956

2,731,663

POT LID WITH MAGNETIC QUICK-DETACHABLE HANDLE

Murray Thompson, New City, N. Y.

Application October 15, 1953, Serial No. 386,168

2 Claims. (Cl. 16—114)

The invention relates to cooking utensils and has particular reference to covered pots and pans.

Utensils of this kind are merchandised in matched sets of graduated diametrical body sizes. Each utensil body usually has a long handle projecting horizontally outward from a point close to its upper edge, or rim, so that it is entirely practicable to nest the bodies of any desired number of the utensils in a vertical stack for compact storage on the shelf of a kitchen cabinet when the utensils are not in use. Nesting of the lids of these idle utensils for the same useful purpose, however, is not practicable because they are very shallow and have bulky centrally located knoblike handles that project upward to a greater extent than the depth of the lid cavities, and these handles are permanently affixed. Consequently, it is the practice to unite each lid to its related utensil and then to suspend these separate units from a wall rack, or to place them on cabinet shelves in an arrangement that occupies many times the space that would be required if the utensil bodies and lids could be nested separately.

With the above-mentioned disadvantage of the permanently affixed pot lid handles in mind, it is the primary object of the present invention to provide cooking utensil lids with handles that are capable of instantaneous attachment and detachment so that the lids as well as their related utensils may be nested for economy of storage space. Of course, the detached handles must be put somewhere but that is easily taken care of by depositing them in the uppermost utensil or lid of its respective stack or by laying them on the shelf alongside the stacked articles.

In accordance with the above object, use is made of magnetic attraction to detachably unite the handle to each utensil lid. Each lid handle conforms in shape and size to the conventional permanently affixed handle heretofore employed but includes in its structure a permanent magnet for attractional contact with a steel armature that is affixed to the top of the related lid. When the handle is brought into armature contact, the magnetic attraction will be so great that the former will adhere tenaciously to the lid and may be used as effectively and safely in handling the lid in the usual manner as if fastened on by mechanical means such as bolts, rivets, or the like. Moreover, it has the added advantage that detached handles of idle utensil lids may be magnetically stuck to a steel storage plate fastened to the cabinet wall. Then, too, if a handle becomes lost, there should always be enough of them remaining to take care of all the utensils ever in use at any one time.

Another object of the invention is to provide a peculiarly efficient mated structure of the handle-carried magnet and lid-carried armature, whereby the most economical form and size of magnet may be adopted without sacrificing adequate magnetic attraction, whereby danger of accidental detachment is eliminated, and also whereby the breaking of magnetic attraction is facilitated in the act of intentionally detaching the handle from the lid.

Other objects, advantages and features of the invention will become apparent as the following specific description is read in connection with the accompanying drawing, in which.

Figure 1:
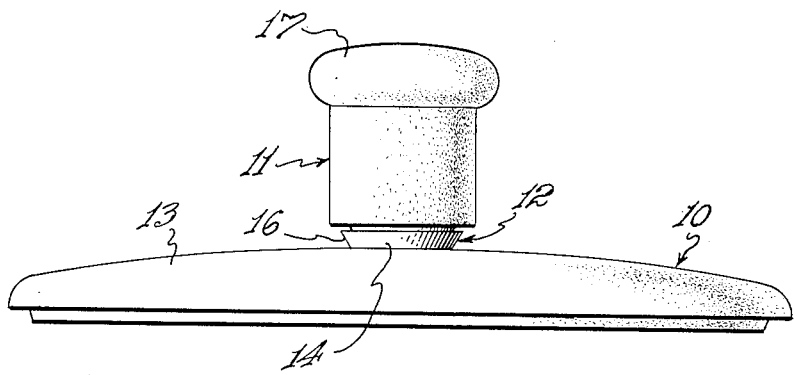
Fig. 1 is a side elevation of a utensil lid with handle attached.
Figure 2:
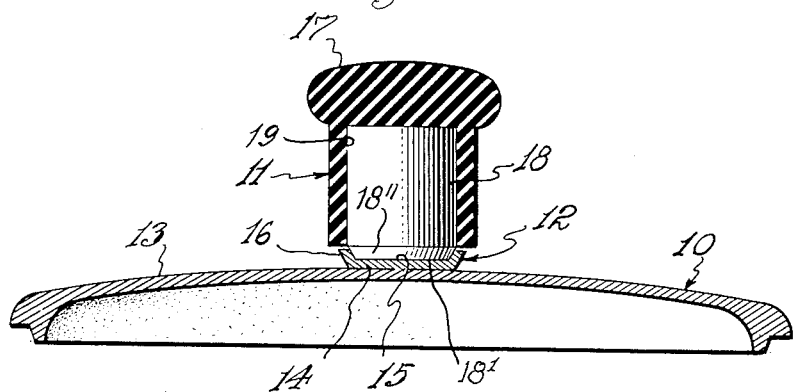
Fig. 2 is a vertical section of the same.

Referring now in detail to the drawings, wherein like reference characters designate corresponding parts in the several views, the principal structural elements of the invention are the utensil cover, or lid, 10 and the handle 11, which are to be provided with means by which they may be firmly attached to each other in an instant of time and which likewise permits as quick detachment.

In accordance with the present invention, magnetic attraction is employed as the attaching means that unites handle 11 with lid 10 in a sufficiently rigid and unyielding manner to permit the lid to be lifted and moved about in applying it to the cooking utensil with which it is matched without any danger of accidental detachment of the lid from the handle. The specific mode of utilization of magnetic attraction for this purpose is illustrated in the drawings.

At the outset it may be explained that an underlying purpose is to so simplify the physical embodiment of the invention without sacrificing any of the required characteristics that the cost to the consumer will not be prohibitive. The achievement of this purpose is favored by the light weight of the utensil element to be supported by the handle and by the fact that permanent magnets are currently available which are so powerful that a very small magnet of extremely simplified form will meet all requirements.

Because the most convenient location for the magnet, although very small in size, is in the handle, the cooperative armature has been located on top of the utensil lid and in the center thereof where it is customary to affix the previously employed permanent handle. Armature 12 may be made of any suitable paramagnetic material, such as steel. Hardened steel is preferred, but this is not necessary since the armature need not become permanently magnetized for adequate performance of its intended function. The specific manner in which armature 12 is affixed to lid 10 depends largely upon the particular metal of which the body 13 of said lid is constructed. If lid body 13 is made of a metal which can be united to armature 12 by welding process, such as stainless steel, then it is preferred to spot weld the armature to the lid body. On the other hand, if armature 12 is to be affixed to aluminum, copper, or similar metals, resort may be had to brazing or the use of rivets or bolts (not shown). Due to the fact that armature 12 does not have to retain any magnetism to be fully effective, the heat of welding or that to which it will be subjected in normal use of the utensil on hot stoves will not have any adverse effect on it.

For a purpose that will become apparent as the specification progresses, armature 12 is dished in form to provide a circular base 14 having an upwardly presented flat seating face 15 and a marginal upturned flange, or wall, 16, which is in the form of an inverted frustrum of a cone, or, in other words, is upwardly flaring to afford an upwardly presented inwardly tapering socket.

Referring now to handle element 11, it will be observed that it comprises two component parts, viz: a handle proper, or finger grip, 17 of the conventional round knoblike form and a permanent magnet 18 which is embedded in a recess 19 that opens through the bottom face of said finger grip. Magnet 18 may be secured tightly in recess 19 in any suitable manner. However, it being preferred to make said finger grip of Bakelite, it may be heated and then shrunk onto magnet 18. Incidentally, Bakelite is a diamagnetic substance which also is a heat insulator so it is admirably suited to use in the handle construction because it will protect the fingers of anyone handling the lid in connection with a utensil being heated on a stove.

It is to be understood that magnet 18 may be made of any of those metallic elements or alloys thereof that may be strongly magnetized and will retain their magnetism relatively permanently. Such a metal is a newly developed alloy of aluminum, nickel, cobalt and iron that is reputed to be capable of producing a truly permanent magnet. By choosing this new alloy, it is possible to reduce the size of magnet 18 to such a degree that it will fit in a finger grip 17 not materially larger than the permanently attached handles commonly used on pot lids. Moreover, it is possible to make magnet 18 substantially cylindrical in form and to arrange finger grip recess 19 with its axis vertical, when handle 11 is in normal upright position, so that one end, or magnetic pole, of the magnet will be exposed beneath finger grip 17. The exposed end of magnet 18 protrudes to a short extent below the outer end of recess 19 and is tapered to provide a flat seating face 18' at right angles to the magnet axis and a frusto-conical side face 18". The diametrical size of magnet 18 and its pole faces 18' and 18" will cause the said pole of the magnet to fit the socket in lid armature 12 with the respective seating faces 18' and 15 of magnet pole and armature in close contact and with side face 18" of the magnet pole abutting the correspondingly shaped inner side face 16' of armature wall 16 but not sufficiently engaged therewith to offer mechanical resistance to withdrawal of said magnet pole from the armature socket. Thus, the only force that resists withdrawal will be magnetic force.

The mechanical functions performed by armature wall 16 and its inner side face 16' in cooperation with the side face 18" of the protruding pole end of magnet 18 are to aid the user of a cooking utensil equipped with the improved magnetic quick-detachable handle in guiding the said pole end of the magnet effortlessly but accurately into operative engagement with the socket of the lid armature, and also to guard against accidental side-slip of the magnet pole such as might result in detachment of the handle 11 from lid 10. Magnetically, frusto-conical side faces 18" and 16' of magnet and armature wall, respectively, serve to increase the effective area of magnetic contact over that which would be afforded if the only areas of contact were those of seating faces 18' and 15. Another magnetic function is to utilize the substantially radial lines of magnetic force emanating from the frusto-conical pole end of magnet 18 as means to bind the magnet pole to armature wall 16 with equal and balanced attractional force all around its periphery and thereby aid said armature wall in mechanically centering the magnet on its seat in resistance to accidental side-slip.

Figures 3, 4:
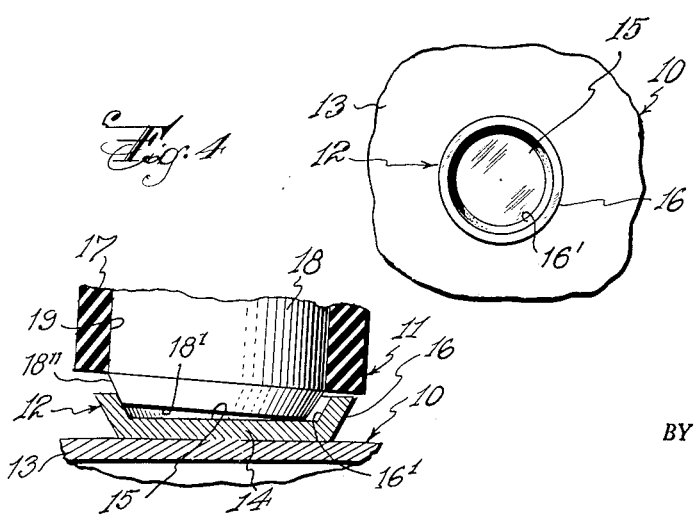
Fig. 3 is a fragmentary plan view of the lid alone.
Fig. 4 is a fragmentary vertical sectional view of lid and handle, showing the handle partially detached.

An additional mechanical function afforded by armature wall 16 may be utilized at the time of detaching handle 11 from lid 10. Turning now to Fig. 4, it will be observed that, if handle 11 be rocked sideways in one direction and at the same time slid in the opposite direction, the tapered pole end of magnet 18 will be wedged upward and outward along inclined inner side face 16' of armature wall 16. The lid 10 should be immobilized by holding it with one hand while the other hand manipulates handle 11. However, if the lid is too hot to hold comfortably, it may be pressed down on the top surface of stove, table or kitchen sink while the handle is rocked and slid sidewards to break the magnetic attachment, all by use of one hand.

It will be understood that it is intended to cover all changes and modifications of the example of the invention herein chosen for the purpose of illustration which do not constitute departures from the spirit and scope of the invention.

Having thus described the invention, I claim:

1. A cooking utensil device comprising: a lid having an armature of paramagnetic material with upwardly presented seating face of fixed outline and area; and a handle for said lid having an attaching magnet with a seating face of outline and area matching the mated face of the lid armature constructed and arranged to fit the seating face of said lid armature, whereby the handle will be bound in seated position by magnetic attraction, said lid armature having an upwardly opening shallow flaring socket to receive the lower end portion of the handle magnet and providing an inclined inner side face for wedging handle-rocking contact with the said lower end of the magnet when slid sideways to release the latter from magnetic attachment to the seating face of the lid armature, the degree of shallowness of the armature socket and of inclination of the inner side face thereof being such that the interengaged portions of the handle magnet and lid armature are united rigidly by magnetic attraction alone and that there will be no mechanical resistance to relative rocking motion thereof and lengthwise withdrawal.

2. A cooking utensil device as defined in claim 1, wherein the lid armature is in the form of an upwardly dished member of sheet material having its base affixed to the top of the utensil lid with its marginal side wall projecting upward therefrom.

References Cited in the file of this patent

UNITED STATES PATENTS

| | | |
|---|---|---|
| 720,380 | Pritchard | Feb. 10, 1903 |
| 1,539,891 | Wood | June 2, 1925 |
| 2,072,569 | Shoan | Mar. 2, 1937 |
| 2,385,859 | Jacobson | Oct. 2, 1945 |
| 2,494,159 | Bernstein | Jan. 10, 1950 |
| 2,623,256 | Feibleman | Dec. 30, 1952 |
| 2,697,642 | Rudy | Dec. 21, 1954 |